United States Patent [19]
Spring et al.

[11] Patent Number: 5,681,144
[45] Date of Patent: Oct. 28, 1997

[54] TURBINE BLADE HAVING OFFSET TURBULATORS

[75] Inventors: Samuel Dale Spring, Stratham, N.H.; Nesim Abuaf, Schenectady, N.Y.; Mohammad Esmail Taslim, Needham, Mass.

[73] Assignee: General Electric Company, Cincinnati, Ohio

[21] Appl. No.: 809,193

[22] Filed: Dec. 17, 1991

[51] Int. Cl.⁶ .................................................. F01D 5/18
[52] U.S. Cl. .................. 416/97 R; 416/96 A; 415/115
[58] Field of Search ........................ 415/115; 416/97 R, 416/96 A, 232, 233; 89/14.1

[56] References Cited

U.S. PATENT DOCUMENTS

| | | | |
|---|---|---|---|
| 3,628,885 | 12/1971 | Sidenstick et al. | 416/97 |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 416/97 R |
| 4,278,400 | 7/1981 | Yamarik et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 415/115 |
| 4,992,026 | 2/1991 | Ohtomo et al. | 415/115 |
| 5,052,889 | 10/1991 | Abdel-Messeh | 416/97 R |
| 5,395,212 | 3/1995 | Anzai et al. | 416/97 R |

FOREIGN PATENT DOCUMENTS

| | | | |
|---|---|---|---|
| 2112467 | 7/1983 | United Kingdom | F01D 5/18 |

OTHER PUBLICATIONS

J.C. Han et al, "Augmented Heat Transfer in Square Channels With Parallel, Crossed, and V-Shaped Angled Ribs," submitted to ASME Journal of Heat Transfer, Jun. 1990, pp. 1–23 and FIGS. 1–13.

S.D. Spring, "Improved Methods For Determining Heat Transfer," The Leading Edge, Winter 1987/1988, Contents page and pages 4–9.

Metzger-Vedula-Breen, "The Effect of Rib Angle and Length on Convection Heat Transfer in Rib–Roughened Triangular Ducts," ASME–JSME Thermal Engineering Conference vol. 3, 1987, pp. 327–333.

Metzger-Fan-Yu, "Effects of Rib Angle and Orientation on Local Heat Transfer in Square Channels with Angled Roughness Ribs", *Compact Heat Exchangers*, copyright 1989, pp: Title and 151–167.

*Primary Examiner*—Michael J. Carone
*Assistant Examiner*—Theresa M. Wesson
*Attorney, Agent, or Firm*—Andrew C. Hess; Wayne O. Traynham

[57] ABSTRACT

A gas turbine engine blade includes an airfoil having first and second sides and an internal passage extending longitudinally therebetween for channeling air to cool the airfoil. Respective pluralities of first and second turbulator ribs extend inwardly from at least one of the first and second airfoil sides. Adjacent ones of second ends of the first and second ribs are staggered apart longitudinally and overlap chordally for defining a gap therebetween facing transversely for turning cooling air upon flow through the gap. The gap increases convective heat transfer enhancement for reducing cooling air requirements and improving blade creep life.

10 Claims, 9 Drawing Sheets

TURBINE BLADE HAVING OFFSET TURBULATORS

TECHNICAL FIELD

The present invention relates generally to gas turbine engines, and, more specifically, to air cooled turbine blades and vanes therein.

BACKGROUND ART

In a conventional gas turbine engine, a compressor pressurizes air which is channeled to a combustor, mixed with fuel, and ignited for generating combustion gases which flow to a turbine disposed downstream therefrom. The turbine extracts energy from the hot combustion gases for powering the compressor. Energy from the combustion gases is also used to propel an aircraft in flight, with one or more turbines either driving a conventional fan for obtaining thrust, or simply discharging the combustion gases from a conventional exhaust nozzle for generating thrust for powering the aircraft.

Conventional turbines include one or more stages of stationary stator nozzles or vanes and rotating rotor blades which typically extract energy from the combustion gases by reaction. The blades and vanes are typically air cooled by a portion of the air pressurized by the compressor in order to provide acceptable life in the gas turbine engine. However, any portion of the compressed air which is utilized for cooling the blades and vanes is not available for undergoing combustion which, therefore, reduces the overall efficiency of the engine. Accordingly, it is desirable to use as little of the compressed air as possible in cooling the blades and vanes consistent with obtaining relatively long useful life of the blades and vanes, which is typically accomplished by providing heat transfer enhancement members such as elongate turbulator ribs within the blades and vanes.

Since gas turbine engine blades and vanes include an airfoil portion over which the combustion gases flow, which airfoil portion includes an internal passage for channeling the cooling air and also contains the turbulator ribs, the term blade as used herein shall mean any member placed within the gas turbine engine flowpath over which flows the combustion gases, such as conventional rotor blades or stator vanes or nozzles.

Turbulator ribs typically used in such blades are conventionally formed as part of the blade casting and project inwardly into the internal passage of the blade through which the cooling air is channeled. The ribs enhance the convective heat transfer coefficient along the inner surface of the blade by tripping or disrupting the cooling air boundary layer which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter.

Enhancement is conventionally related to the height or projection of the ribs Into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.07 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing therebetween for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases, which, therefore, typically decreases the amount of airflow available for cooling. Accordingly, the effectiveness of turbulator ribs must be evaluated by their ability to provide effective enhancement without undesirable levels of pressure losses associated therewith.

OBJECTS OF THE INVENTION

Accordingly, one object of the present invention is to provide a new and improved gas turbine engine blade.

Another object of the present invention is to provide a blade having improved turbulator ribs for increasing convective heat transfer enhancement.

Another object of the present invention is to provide a blade having improved enhancement for reducing cooling airflow requirements for obtaining improved blade life and performance of the gas turbine engine.

DISCLOSURE OF INVENTION

A gas turbine engine blade includes an airfoil having first and second sides and an internal passage extending longitudinally therebetween for channeling air to cool the airfoil. Respective pluralities of first and second turbulator ribs extend inwardly from at least one of the first and second airfoil sides. Adjacent ones of second ends of the first and second ribs are staggered apart longitudinally and overlap chordally for defining a gap therebetween facing transversely for turning cooling air upon flow through the gap.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
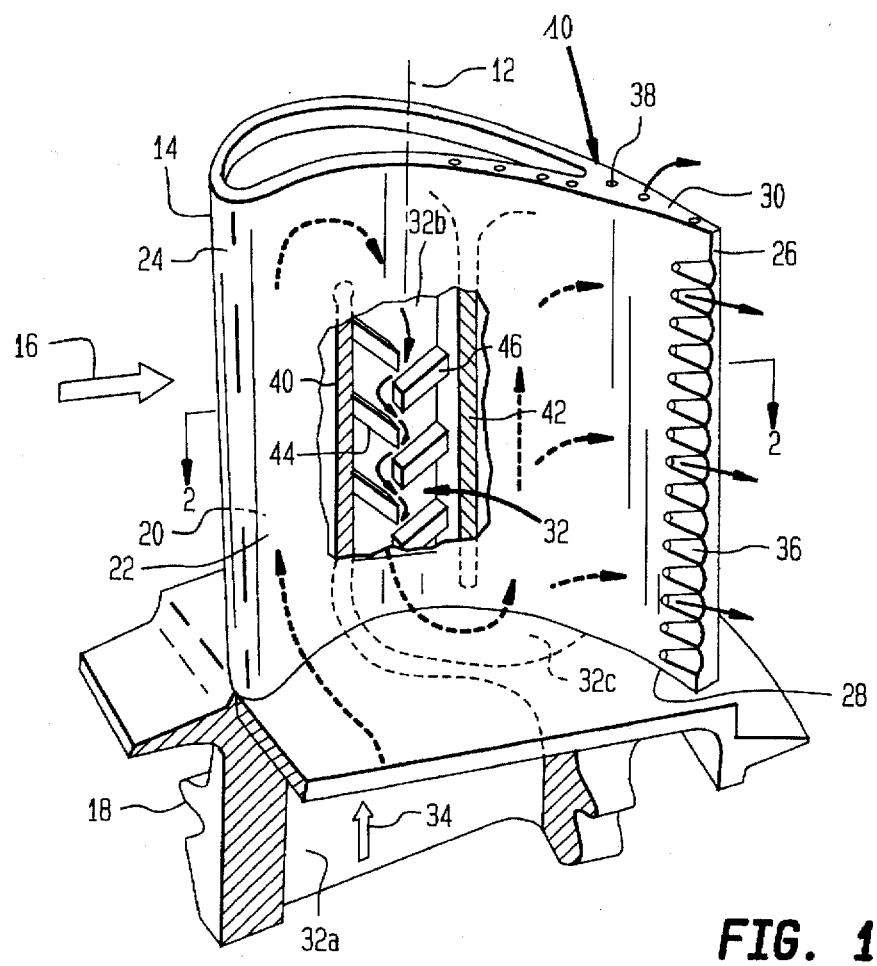
FIG. 1 is a schematic, perspective view, partly in section, of an exemplary gas turbine engine blade including turbulators in accordance with one embodiment of the present invention.

Illustrated schematically in FIG. 1 is an exemplary gas turbine engine rotor blade 10 having a longitudinal or radial axis 12. The blade 10 includes an airfoil 14 which is conventionally disposed in a gas turbine engine (not shown) and over which flows hot combustion gases 16 generated by a conventional combustor (not shown). As used herein, the term blade shall mean any member disposed within a hot gas flow such as the combustion gases 16 and, for example, includes the rotor blade 10 illustrated, and stator vanes or nozzles. The blade 10 as a rotor blade is conventionally joined to a rotor disk (not shown) by a conventional dovetail 18 extending downwardly from the airfoil 14. The blade 10 may also represent a conventional stator vane or nozzle wherein the airfoil 14 is conventionally joined to a stator casing and conventionally channels the combustion gases 16 to conventional rotor blades disposed downstream therefrom (not shown).

The outer configuration of the airfoil 14 is conventional and includes a first sidewall, or side, 20, which is also known as the convex or suction side of the airfoil 14, and a second sidewall, or side, 22, which is also known as the concave or pressure side of the airfoil 14. The first and second sides 20 and 22 are joined together at a longitudinally extending leading edge 24 and a trailing edge 26 and extend longitudinally from a root 28 to a tip 30. The root 28 is the lowermost portion of the airfoil 14 over which the combustion gases 16 flow, and the tip 30 is the outermost portion of the airfoil 14 over which the gases 16 flow.

Figure 2:
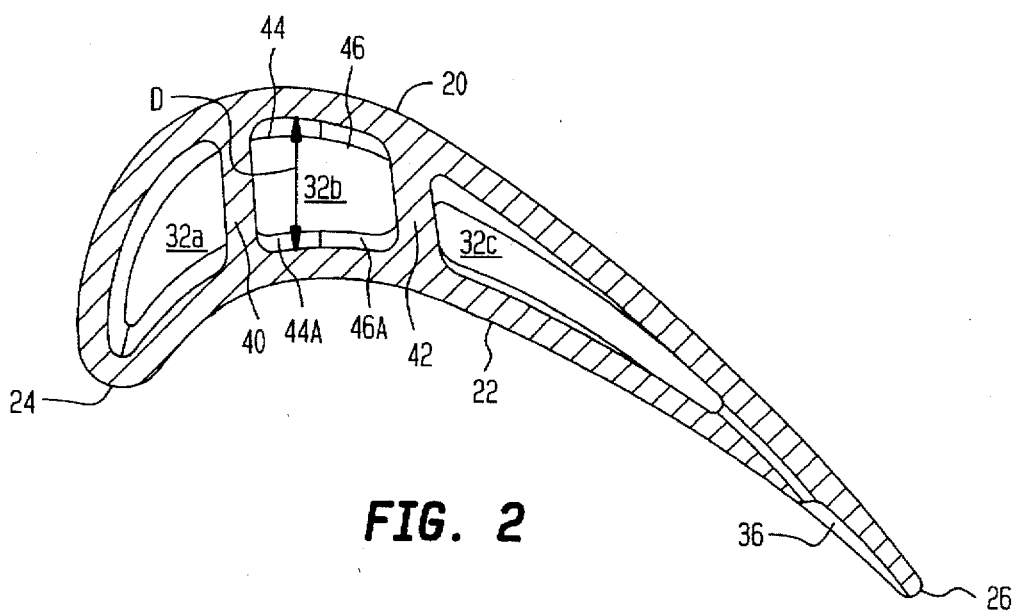
FIG. 2 is a transverse, partly sectional view of the blade illustrated in FIG. 1 taken along line 2—2.

Referring to both FIGS. 1 and 2, the airfoil 14 includes an internal passage 32 which extends longitudinally between the first and second sides 20 and 22 for channeling compressed air 34 as cooling air to cool the airfoil 14. More specifically, the cooling air 34 is conventionally channeled from a compressor of the gas turbine engine (not shown) through the dovetail 18 and upwardly into the airfoil 14. The passage 32 in the exemplary embodiment illustrated is a serpentine passage including a leading edge passage 32a which extends from the dovetail 18 upwardly through the airfoil 14 to the tip 30 wherein the air 34 is turned 180° into a midchord passage 32b and flows longitudinally downwardly in the airfoil 14 to the root 28 wherein the air 34 is again turned 180° upwardly into a trailing edge passage 32c which extends to the tip 30. The air 34 from the trailing edge passage 32c is conventionally discharged from the airfoil 14 through a plurality of trailing edge apertures 36 and tip holes 38 for example.

In the exemplary embodiment illustrated in FIGS. 1 and 2, the internal passage 32 is defined between the first and second sides 20 and 22, with the three portions thereof being additionally defined by an upwardly extending first partition 40 extending from the dovetail 18 longitudinally upwardly between the first and second sides 20 and 22 to form a gap with the tip 30 for allowing the air 34 to turn from the leading edge passage 32a downwardly into the midchord passage 32b. A second partition 42 is spaced aft of the first partition 40 and extends downwardly from the tip 30 toward the root 28 to form a gap adjacent to the dovetail 18 in which the cooling air 34 turns from the midchord passage 32b upwardly into the trailing edge passage 32c.

The blade 10 as so configured above is conventional but includes improved convective heat transfer enhancement in accordance with the present invention. More specifically, a plurality of longitudinally spaced apart and parallel, elongate first turbulator ribs 44 extend perpendicularly inwardly from at least one, and preferably both, of the first and second sides 20 and 22 into the passage 32, such as the midchord passage 32b illustrated in FIGS. 1 and 2. Similarly, a plurality of longitudinally spaced apart and parallel, elongate second turbulator ribs 46 extend perpendicularly outwardly from at least one, and preferably both, of the first and second sides 20 and 22 into the passage 32, such as the midchord passage 32b.

Figure 3:
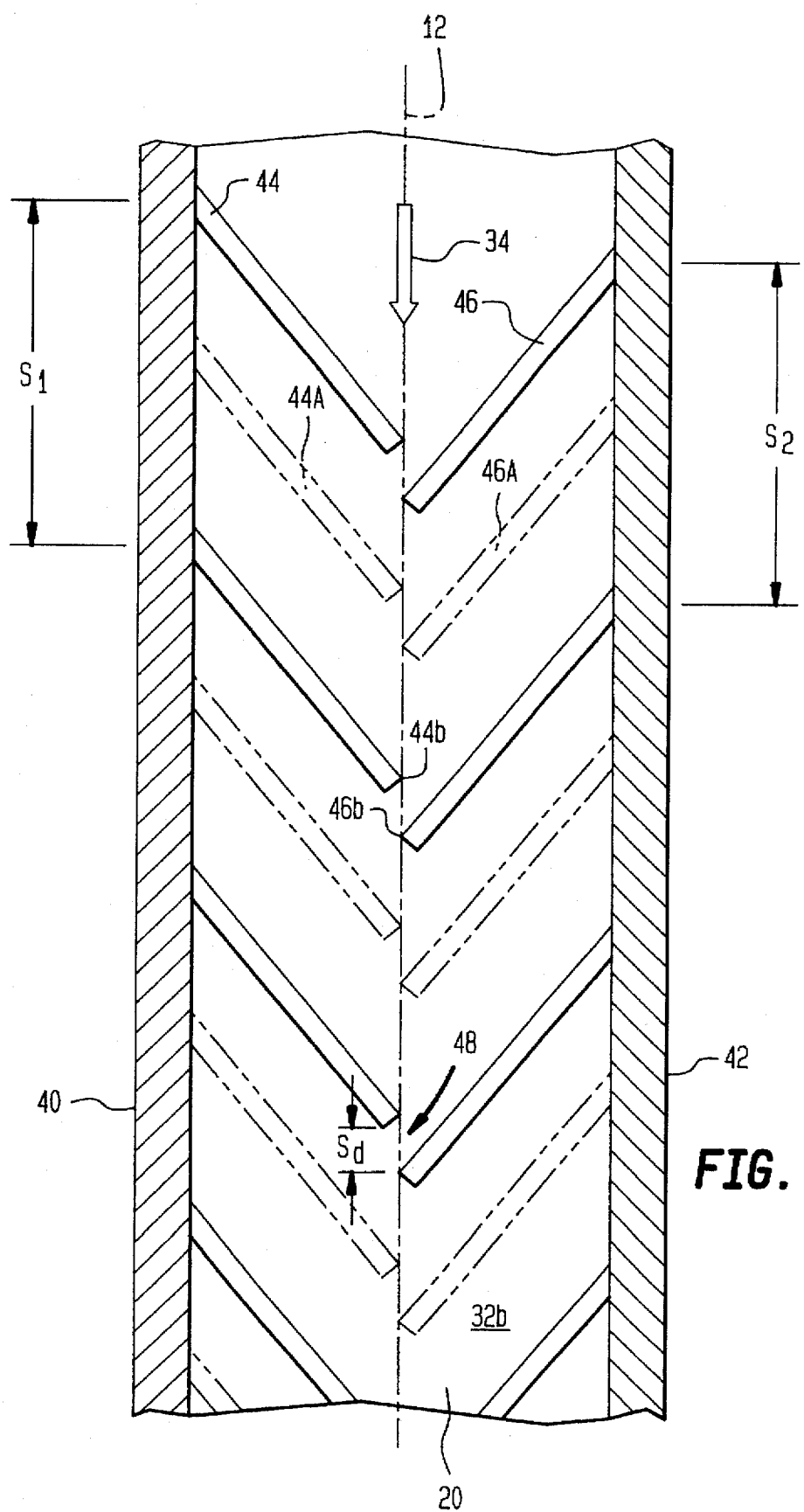
FIG. 3 is a longitudinal, partly sectional view of the turbulators in the midchord passage of the blade illustrated in FIG. 1.
Figure 4:
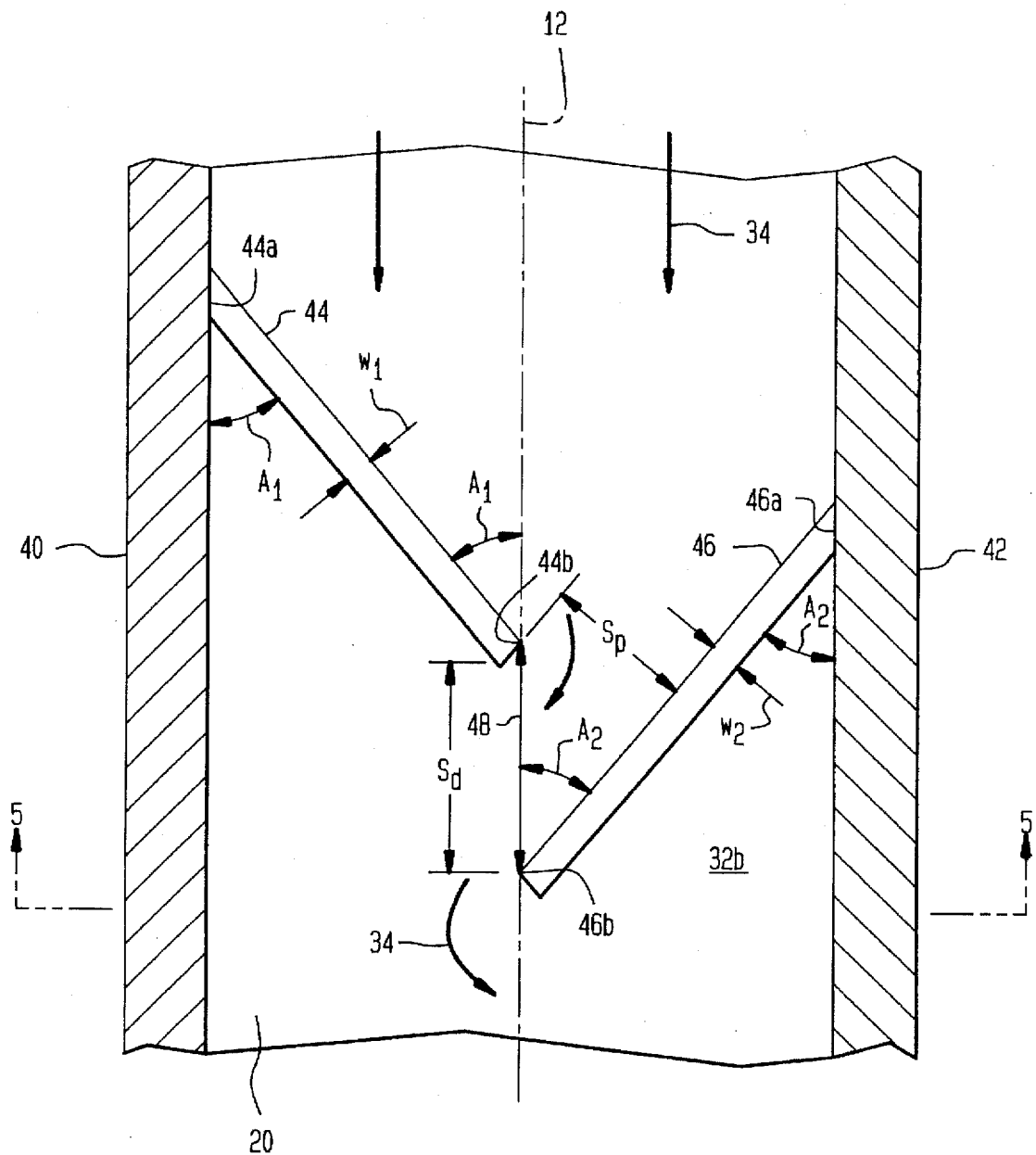
FIG. 4 is an enlarged, longitudinal, partly sectional view of the midchord passage illustrated in FIG. 3 showing two adjacent first and second turbulator ribs.
Figure 5:
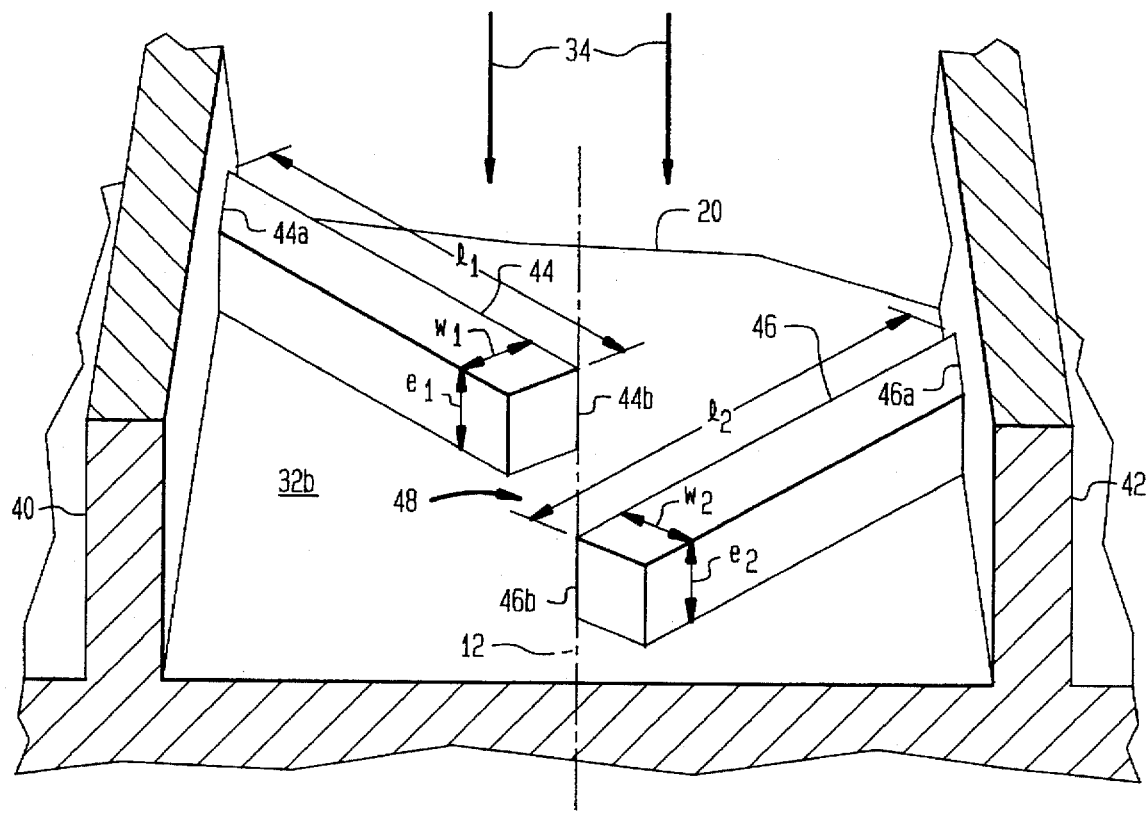
FIG. 5 is a perspective, partly sectional view of the first and second turbulator ribs illustrated in FIG. 4 taken generally along line 5—5.

A further description of the first and second ribs 44 and 46 on the first side 20 is provided with respect to FIGS. 3–5, with it being understood that similar first and second ribs designated 44A and 46A are preferably also provided on the second side 22 in the midchord passage 32b as shown in solid line in FIG. 2 and in phantom line in FIG. 3.

The first ribs 44 preferably have substantially equal or identical configurations with each first rib 44 including a first height $e_7$, as shown in FIG. 5, measured perpendicularly inwardly from its base at the airfoil first side 20 to its tip, a first length $l_1$ measured between a first end 44a and an opposite second end 44b, and a first width $w_1$ measured between opposite sides of the first rib 44 perpendicularly to the first length $l_1$.

Similarly, the second ribs 46 also preferably have substantially equal or identical configurations, with each second rib 46 including a second height $e_2$ measured perpendicularly inwardly from its base at the airfoil first side 20 to its tip, a second length $l_2$ measured between a first end 46a and an opposite second end 46b, and a second width $w_2$ measured between the opposite sides of the second rib 46 perpendicularly to the second length $l_2$.

The first ribs 44 are longitudinally spaced apart from each other at equal first longitudinal spacings $S_1$ as shown in FIG. 3, and the second ribs 46 are similarly longitudinally spaced apart from each at equal second longitudinal spacings $S_2$ in the preferred embodiment. The longitudinal spacings $S_1$ and $S_2$ may be conventionally measured between respective centerlines of adjacent ribs 44, 46 as shown. Also in the preferred embodiment, the rib first and second heights $e_1$ and $e_2$ are substantially equal to each other, and the rib first and second widths $w_1$ and $w_2$ are also substantially equal to each other, and equal also to the heights $e_1$, and $e_2$, respectively, for forming substantially square transverse cross sections. Since the first and second longitudinal spacings $S_1$ and $S_2$ are preferably equal, the ratio of the first longitudinal spacing $S_1$ to the first rib height $e_1$, i.e., $S_1/e_1$, is preferably substantially equal to the ratio of the second longitudinal spacing $S_2$ to the second rib height $e_2$, i.e., $S_2/e_2$. Such spacing-to-height ratios are preferably conventional and may be within the range of about 5 to about 10 for providing effective convective heat transfer enhancement downstream from the respective first and second ribs 44 and 46. The first and second sides 20 and 22 in the midchord passage 32b are transversely spaced apart at a spacing D (see FIG. 2), and the rib heights $e_1$, $e_2$ relative to that spacing D define ratios $e_1/D$ and $e_2/D$ which are conventionally selected for obtaining effective enhancement from the first and second ribs 44 and 46. For example, such ratios may be about 0.07 and higher. The spacing D may alternatively be the hydraulic diameter which is equal to four times the flow area divided by the wetted perimeter as is conventionally known. The first and second ribs 44 and 46 conventionally trip the cooling air 34 for creating turbulence which enhances the convective heat transfer coefficient.

In order to provide more effective enhancement in accordance with the present invention, the two pluralities of first and second ribs 44 and 46 are provided on each side of the blade 10 within the midchord passage 32b with adjacent ribs 44, 46 being longitudinally offset from each other. In particular, adjacent ones of the second ends 44b and 46b of the first and second ribs 44 and 46 are staggered apart longitudinally at a longitudinal stagger distance $S_d$ measured parallel to the axis 12, as shown In FIG. 4. The rib second ends 44b and 46b are also overlapped chordally in the chordwise direction perpendicular to the longitudinal axis 12 to prevent longitudinal line-of-sight viewing therebetween for defining a side or longitudinal gap 48 therebetween facing sideways toward the first partition 40 for example. As shown In FIG. 3, each of the first ribs 44 is staggered upstream from a respective second rib 46 at the stagger distance $S_d$ with their second ends 44b, 46b overlapping perpendicular to the axis 12 or perpendicular to the general longitudinal flow direction of the air 34 for defining the respective side gaps 48 between adjacent ones of the first and second ribs 44 and 46.

As shown in more particularity in FIG. 4, the side gap 48 faces transversely to the longitudinal axis 12, or transversely to the general longitudinal direction of the cooling air 34 which flows downwardly in the midchord passage 32b, for turning the portion of the cooling air 34 which flows along the inside surface of the first side 20 away from the longitudinal axis 12 upon flowing through the gap 48. If the second ends 44b and 46b did not overlap along the chordal direction, the resulting transversely extending center gap formed therebetween would face downwardly in the longitudinal direction allowing direct line-of-sight viewing longitudinally between the adjacent rib second ends 44b, 46b. This would allow the cooling air 34 to flow downwardly as well and parallel to the longitudinal axis 12 without undergoing any turning as provided by the present invention. The gap 48, therefore, preferably extends only longitudinally and not transversely in the chordal direction. The second ends 44b and 46b of the first and second ribs 44 and 46 need only be aligned longitudinally which each other, i.e., with the second rib end 44b disposed directly above the second rib end 46b and longitudinally spaced apart at the stagger distance $S_d$ to form the side gap 48 which confines the cooling air 34 to turn, and thereby accelerate, as it flows past each of the first ribs 44 and then downwardly past each of the second ribs 46 in turn. The turning of the cooling air 34 through the side gaps 48 therefore accelerates the cooling air 34 from the downstream second ends 44b, 46b and increases the convective heat transfer coefficient, or enhancement, on the first side 20 in the region of the second ends 44b and 46b and downstream therefrom.

Figure 4A:
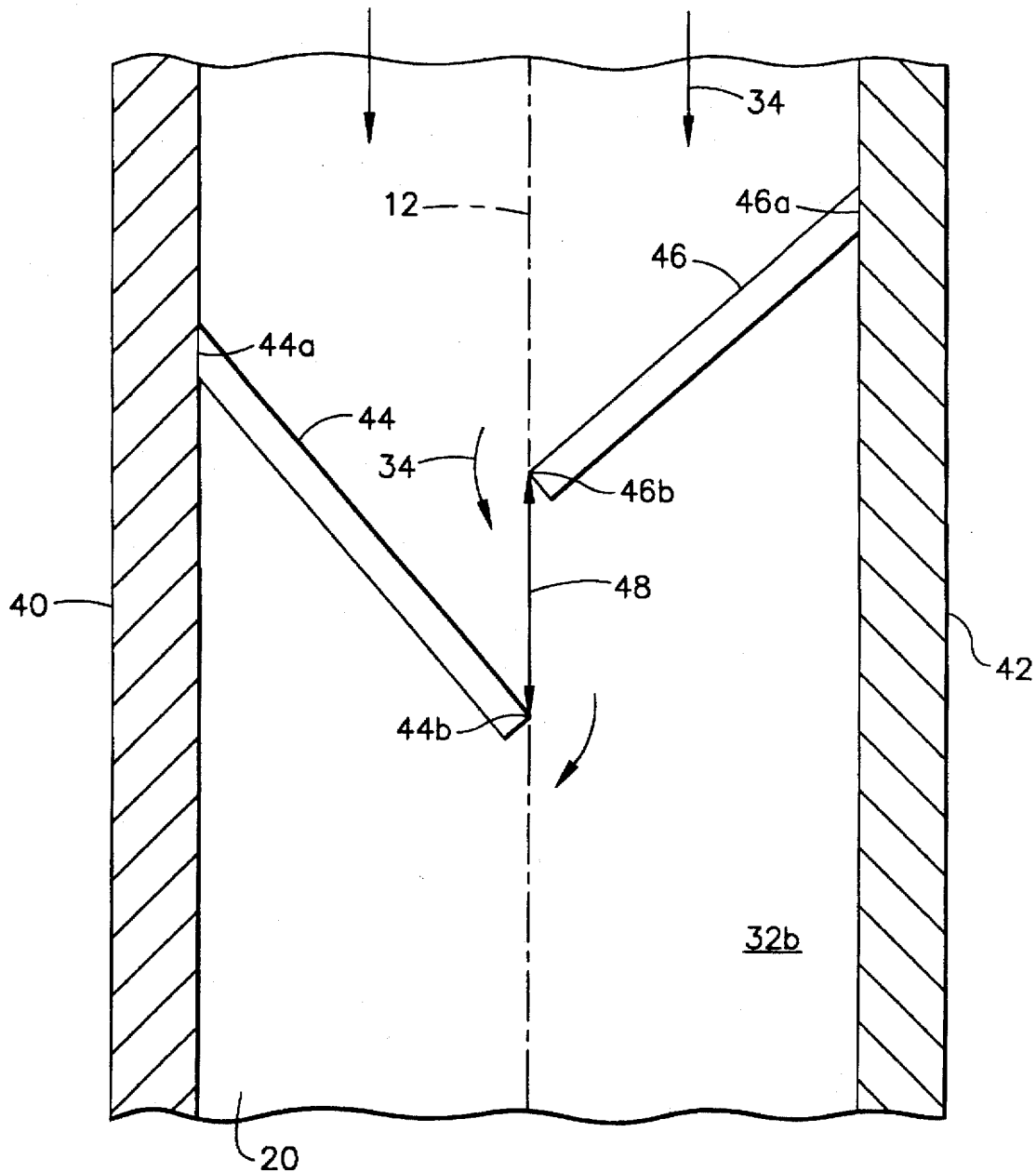
FIG. 4A is an alternate embodiment of the present invention depicted in FIG. 4.

As shown in the exemplary embodiment illustrated in FIG. 4, the first rib 44 is disposed above the second rib 46, or upstream of the second rib 46, with its second end 44b also being spaced perpendicularly away from the second rib 46 at a spacing $S_p$ perpendicular thereto. The values of the longitudinal stagger distance $S_d$ and the perpendicular spacing $S_p$ may vary from minimum to maximum values with the first rib 44 being disposed relatively closely to the top of the below-adjacent second rib 46 for forming the side gap 48 which discharges the cooling air 34 to the left as illustrated in FIG. 4, or, in an alternate embodiment of the invention, the first rib 44 may be positioned relatively upwardly in the midchord passage 32b and relatively closely to the bottom of the above-adjacent second rib 46 with the resulting side gap 48 between the respective second ends 44b and 46b thin causing the cooling air 34 to flow generally to the right instead of to the left, as depicted in FIG. 4A. For the exemplary embodiment illustrated in FIG. 4 wherein the first and second widths $w_1$ and $w_2$ are equal to each other, the minimum perpendicular spacing $S_p$ may be about the value of $w_1$ or $w_2$. For effective performance, the minimum value of the spacing $S_p$ should allow the cooling air 34 to turn and accelerate through the side gap 48 as it flows downwardly through the midchord passage 32b for thusly enhancing the convective heat transfer coefficient on the first side 20.

Referring again to FIG. 4, the first and second ribs 44 and 46 are preferably straight, with the first ribs 44 being inclined relative to the longitudinal axis 12, or the generally longitudinal direction of the cooling air 34 flowing in the midchord passage 32b, at a first acute angle $A_1$. The second ribs 46 are similarly, but oppositely inclined relative to the longitudinal axis 12 at a second acute angle $A_2$. Since the first and second partitions 40 and 42 are generally parallel in the embodiment illustrated in FIG. 4, and therefore generally parallel to both the longitudinal axis 12 and the nominal direction of the cooling air 34, the first and second ribs 44 and 46 are also oppositely inclined relative to the first and second partitions 40 and 42 at the first and second acute angles $A_1$ and $A_2$, respectively.

Also In the preferred embodiment, the first ends 44a and 46a of the first and second ribs 44 and 46 face in the upstream direction relative to the flow of the cooling air 34 in the midchord passage 32b and are disposed above the second ends 44b and 46b, respectively. Correspondingly, the second ends 44b and 46b of the first and second ribs 44 and 46 face in the downstream direction relative to the flow of the cooling air 34, and are disposed below the first ends 44a and 46a, respectively. In this way, the cooling air 34 adjacent to the first side 20 is channeled adjacent to the first partition 40 and is guided along the first rib 44 from the upstream end 44a and down to and around its downstream end 44b for creating swirl of the cooling air 34 from the first partition 40 toward the center of the midchord passage 32b at the gap 48. Similarly, the second rib 46 is also inclined in the downstream direction so that the cooling air 34 flowing along the first side 20 and adjacent to the second partition 42 is guided along the second rib 46 from its first end 46a and downwardly to and around its second end 46b for similarly creating an opposing swirl from the second partition 42 toward the middle of the midchord passage 32b at the gap 48. In this way, enhancement is increased both immediately downstream of the first and second ribs 44 and 46 beginning at their upstream first ends 44a and 46a and downstream therefrom. And, the turning of the cooling air 34 by the first and second ribs 44 and 46 between the gap 48 further enhances the convective heat transfer coefficient in the region of the gap 48 and downstream therefrom. Tests suggest that the optimum values of the first and second angles $A_1$ and $A_2$ are within the range of about 45° to about 60° for providing a significant increase in enhancement downstream from the first and second ribs 44 and 46. In the preferred embodiment, the first and second angles $A_1$ and $A_2$ are equal to each other.

Also in the preferred embodiment, the first and second ribs 44 and 46 have equal lengths $I_1$ and $I_2$ and extend from the centerline of the midchord passage 32b, as represented by the longitudinal axis 12 in this exemplary embodiment, and transversely outwardly therefrom all the way to the first and second partitions 40 and 42, respectively. The first ends 44a and 46a are preferably fixedly joined to the first and second partitions 40 and 42, respectively, which may be accomplished by conventionally casting the first and second ribs 44 and 46 integrally to the airfoil first side 20 and to the first and second partitions 40 and 42. In this way, none of the cooling air 34 is allowed to flow along the first side 20 between the first ends 44a and 46a and the respective first and second partitions 40 and 42 since no gap is provided therebetween along the first side 20. The swirling effect of the cooling air 34 is therefore enhanced with the relatively cool first and second partitions 40 and 42, as compared to the first side 20 which faces the combustion gases 16, further promoting enhancement.

Figure 4B:
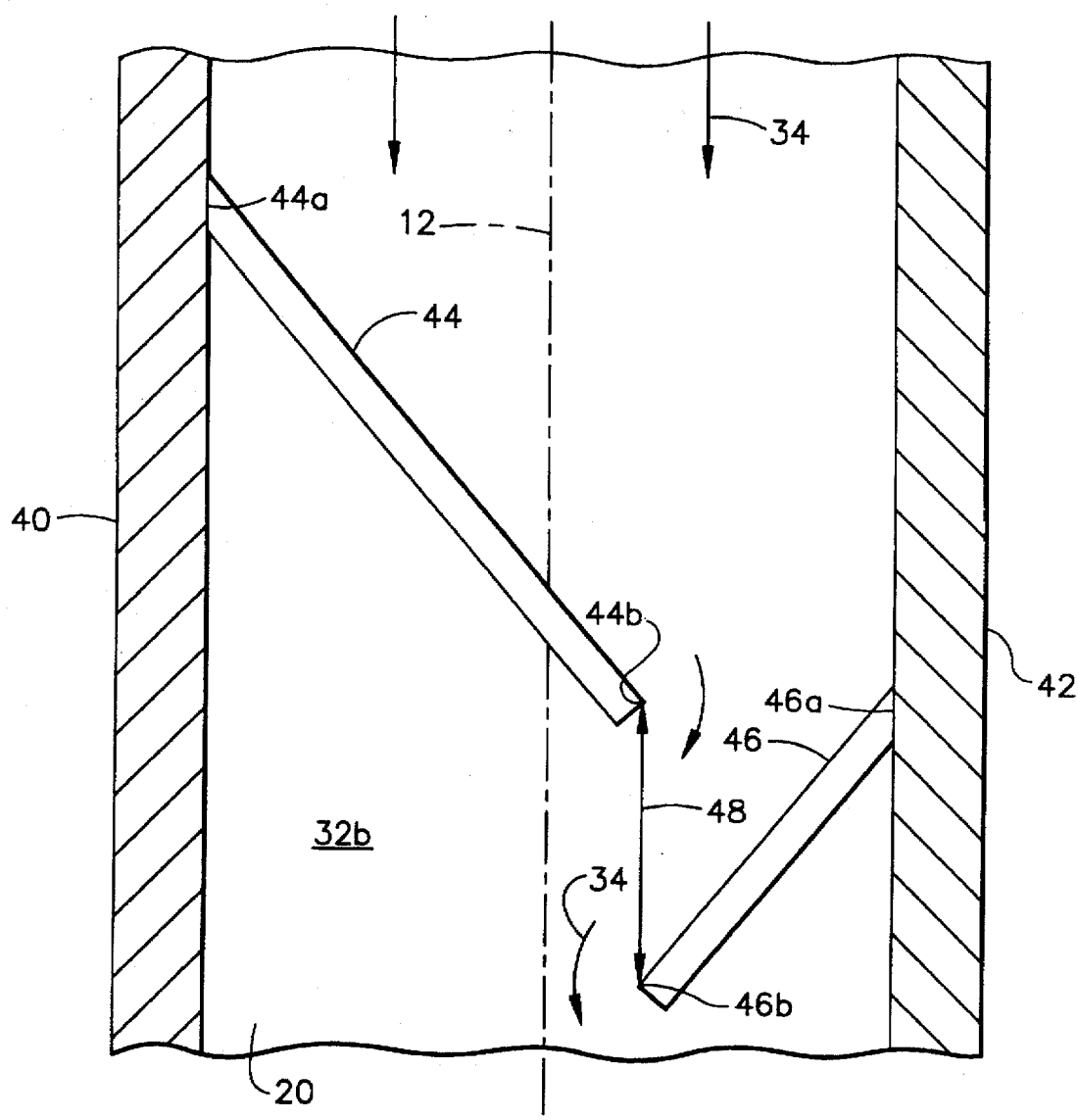
FIG. 4B is yet another alternate embodiment of the present invention depicted in FIG. 4.
Figure 4C:
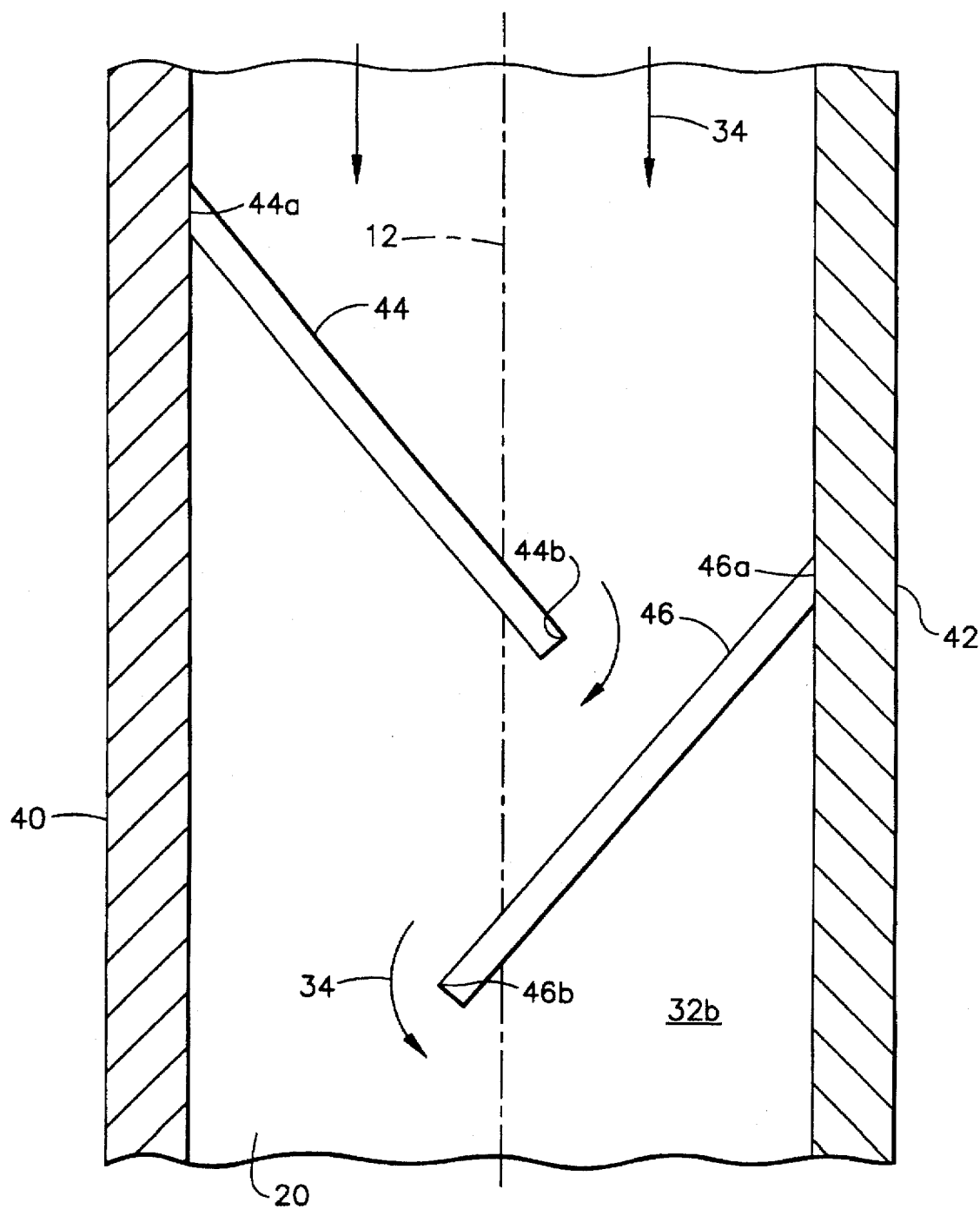
FIG. 4C is a further alternate embodiment of the present invention depicted in FIG. 4.

The lengths 11 and 12 of the first and second ribs 44 and 46 could, alternatively, be unequal with the ribs 44, 46 still overlapping each other at the second ends 44b, 46b, and the side gap 48 may be transversely spaced away from the centerline of the midchord passage 32b in the chordal direction as shown, for example, in FIG. 4B. Furthermore, the extent of the chordal overlap of the second ends 44b, 46b may be increased as desired, with the second ends 44b, 46b being transversely spaced past the respective adjacent second ends 46b, 44b toward the respective second and first partitions 42, 40 for further increasing turning of the cooling air 34 as depicted in FIG. 4C.

Figure 3A:
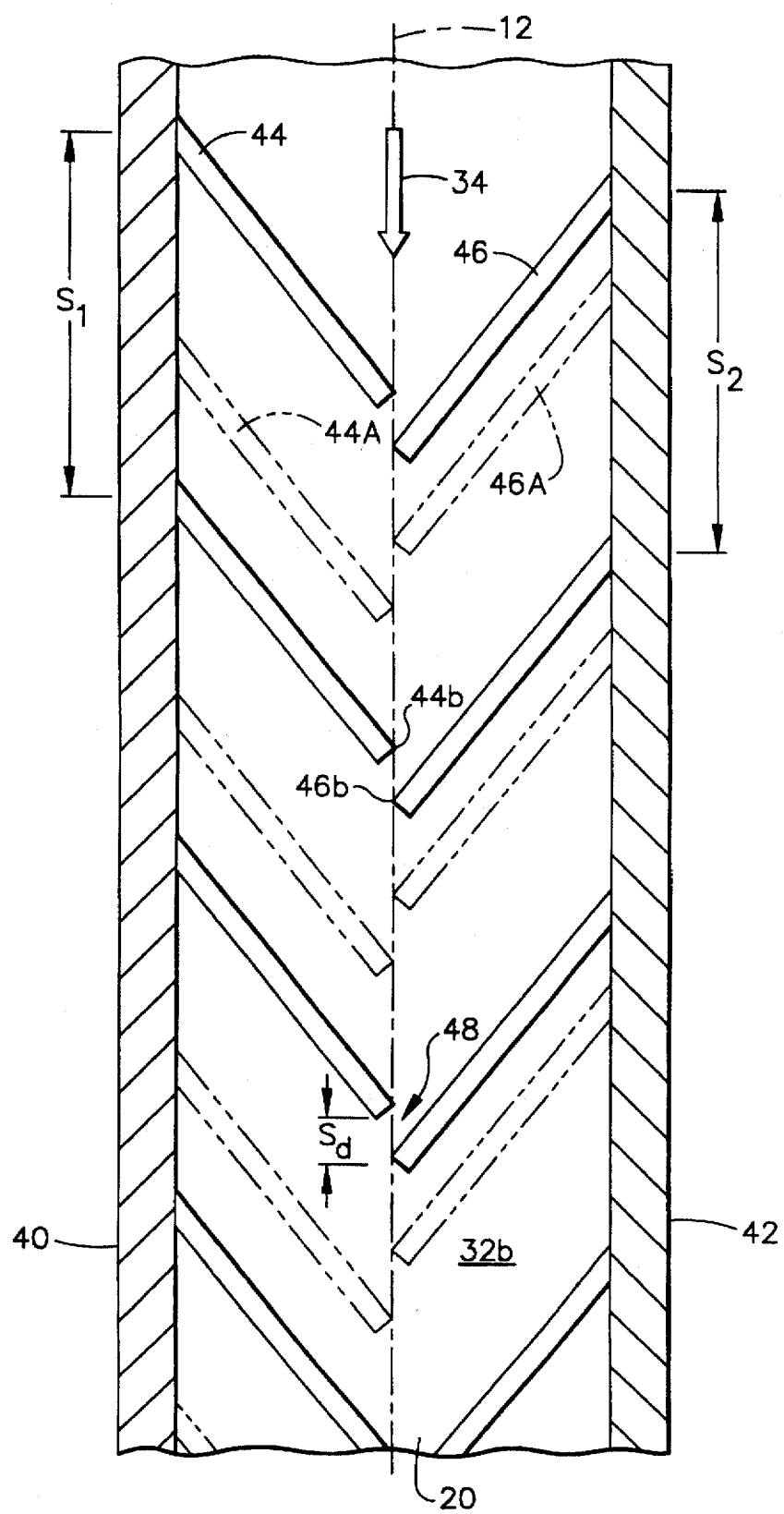
FIG. 3A is an alternate embodiment of the present invention depicted in FIG. 3.

Referring again to FIGS. 2 and 3, the airfoil second side 22 preferably also includes respective pluralities of the first and second ribs, i.e., ribs 44A and 46A, facing toward the first and second ribs 44 and 46 on the first side 20 in the midchord passage 32b. Although the respective first ribs 44 and 44A, and respective second ribs 46 and 46A may be disposed longitudinally in-line with each other on the opposing first and second sides 20 and 22, in the preferred embodiment, the first ribs 44 and 44A on the first and second sides 20 and 22 are longitudinally staggered relative to each other as shown in FIG. 3. Similarly, the second ribs 46 and 46A are also preferably similarly longitudinally staggered relative to each other. In this way, improved enhancement may be obtained on both of the first and second sides 20 and 22 while reducing the effective blockage and pressure losses associated with the opposing sets of first ribs 44, 44A and second ribs 46, 46A. Also in the preferred embodiment, the gaps 48 formed between the first and second ribs 44 and 46, and the respective gaps 48 formed between the first and second ribs 44A and 46A on the second side 22, both face in the same direction, for example to the left as illustrated in FIG. 3 for turning the cooling air 34 in the same direction from the respective gaps 48 toward the first partition 40. In alternate embodiments, the respective gaps 48 on the first and second sides 20 and 22 could face oppositely to each other for turning respective portions of the cooling air 34 toward the first partition 40 and the second partition 42 as shown in FIG. 3A.

Figure 2A:
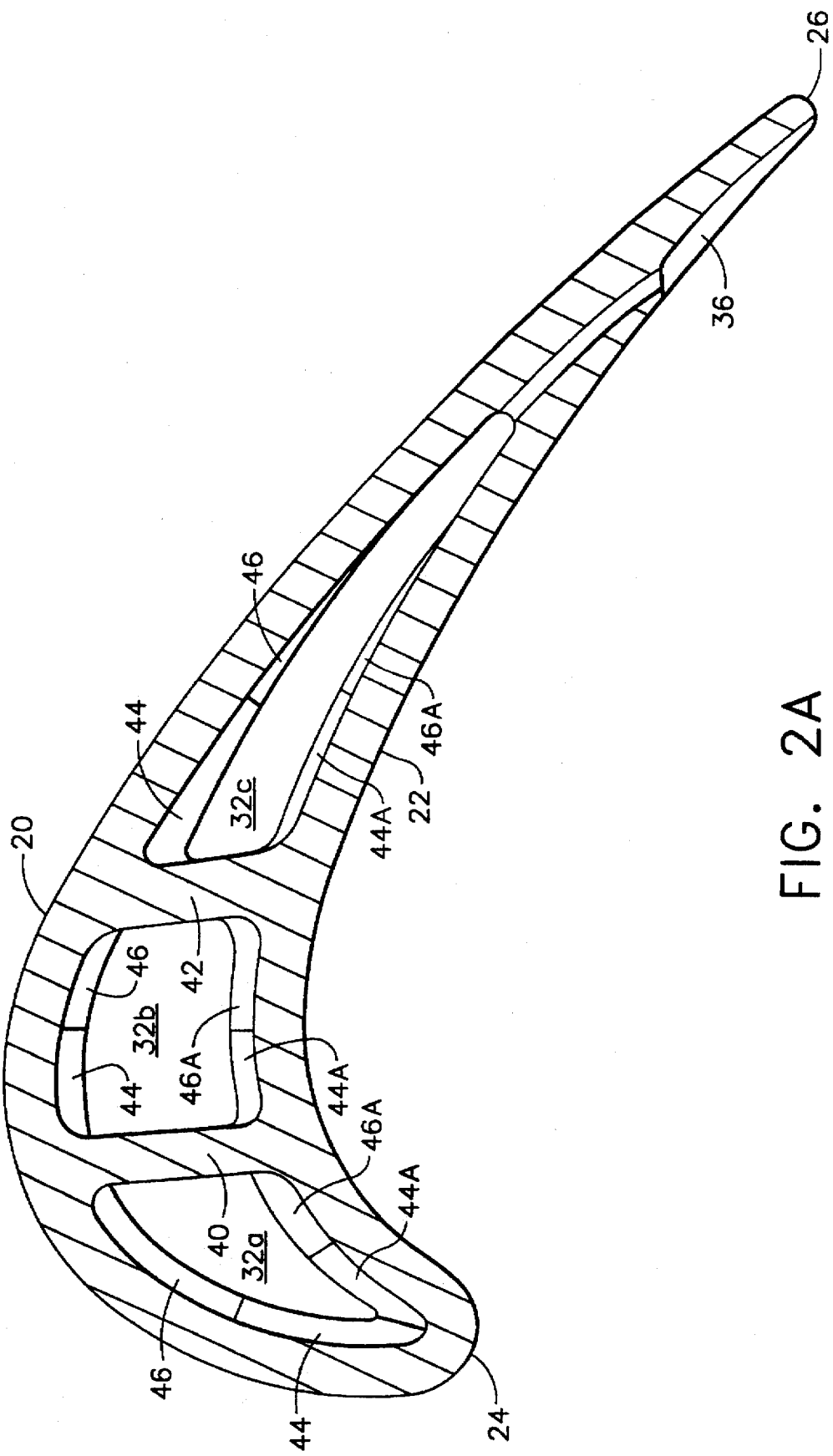
FIG. 2A is an alternate embodiment of the present invention depicted in FIG. 2.

Although FIG. 2 illustrates conventional ribs in both the leading and trailing edge passages 32a and 32c, those ribs could in alternate embodiments, be configured in accordance with the present invention, as depicted in FIG. 2A, for providing improved enhancement also therein, with such improved enhancement allowing reduction in cooling air flow requirements and improved blade creep life, and, therefore, improved gas turbine engine performance.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention. For example, although a three-pass serpentine passage 32 is illustrated for the exemplary embodiment, the invention may be practiced in any cooling passage of any type of air cooled member having one or more cooling air passages therein.

Accordingly, what is desired to be secured by Letters Patent of the United States is the Invention as defined and differentiated in the following claims:

We claim:

1. A turbine blade having a longitudinal axis comprising:
   an airfoil having a first side and an opposite second side joined together at a leading edge and a trailing edge, and extending longitudinally from a root to a tip, and an internal passage extending longitudinally between said first and second sides for channeling air to cool said airfoil;
   a plurality of first turbulator ribs extending inwardly from said first side into said passage, and having substantially identical configurations including a first height measured inwardly from said first side, a first length measured between first and second opposite ends of said first rib, a first width, and being longitudinally spaced apart at a first longitudinal spacing;
   a plurality of second turbulator ribs extending inwardly from said first side into said passage, and having substantially identical configurations including a second height measured inwardly from said first side, a second length measured between first and second opposite ends of said second rib, a second width, and being longitudinally spaced apart at a second longitudinal spacing; and
   adjacent ones of said first and second rib second ends being staggered apart longitudinally and overlapped chordally for defining a gap therebetween facing transversely to said longitudinal axis for turning said cooling air away from said longitudinal axis upon flow through said gap.

2. A blade according to claim 1 wherein said first and second ribs are straight, said first ribs are inclined at a first acute angle relative to said longitudinal axis, and said second ribs are inclined at a second acute angle relative to said longitudinal axis.

3. A blade according to claim 2 wherein said first and second rib first ends face in an upstream direction relative to flow of said cooling air in said passage, and said first and second rib second ends face in a downstream direction relative to said cooling air flow.

4. A blade according to claim 3 wherein said airfoil further includes first and second partitions extending longitudinally between said airfoil first and second sides, and being transversely spaced apart to define with said airfoil first and second sides said internal passage, and further wherein said first ends of said first and second ribs are fixedly joined to said first and second partitions, respectively.

5. A blade according to claim 4 wherein tips of said first and second ribs, and upstream facing sides of said first and second ribs are substantially flat.

6. A blade according to claim 4 wherein the ratio of said first longitudinal spacing to said rib first height is substantially equal to the ratio of said second longitudinal spacing to said rib second height.

7. A blade according to claim 6 wherein said first and second acute angles are equal.

8. A blade according to claim 7 wherein said second side includes respective pluralities of said first and second ribs facing toward said first and second ribs on said first side.

9. A blade according to claim 8 wherein said first ribs on said first and second sides are longitudinally staggered relative to each other, and said second ribs on said first and second sides are longitudinally staggered relative to each other.

10. A blade according to claim 9 wherein said gaps formed between said first and second ribs on both said first and second sides face in the same direction.

* * * * *